United States Patent [19]

Fujinami et al.

[11] 3,716,552
[45] Feb. 13, 1973

[54] N'-ALKANOYL-N''-DIHALOPHENYL IMIDAZOLIDINEDIONES

[75] Inventors: Akira Fujinami, Ashiya; Toshiaki Ozaki, Toyonaka; Keiichiro Akiba, Ikeda; Sigeo Yamamoto, Toyonaka; Katsuji Nodera, Nishinomiya; Katsutoshi Tanaka, Takarazuka; Nobuyuki Kameda, Takarazuka; Tadashi Ooishi, Takarazuka, all of Japan

[73] Assignee: Sumitomo Chemical Company, Ltd., Osaka, Japan

[22] Filed: Oct. 5, 1970

[21] Appl. No.: 78,263

[30] Foreign Application Priority Data

Oct. 9, 1969 Japan..................................44/80887

[52] U.S. Cl.................................260/309.5, 424/269
[51] Int. Cl. ...............................................C07d 49/34
[58] Field of Search............................260/309.5, 72

[56] References Cited

UNITED STATES PATENTS 3,325,361  6/1967  Meunier...........................260/309.5

Primary Examiner—Harry I. Moatz
Attorney—Stevens, Davis, Miller & Mosher

[57] ABSTRACT

Novel 3-(3',5'-dihalogenophenyl)-1-acylimidazolidine-2,4-diones of the formula,

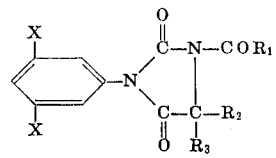

wherein X is a halogen atom, $R_1$ is a lower alkyl group, a lower alkenyl group, or a halogenated lower alkyl group having one to three halogen atoms, and $R_2$ and $R_3$ are individually a hydrogen atom or a lower alkyl group. The novel imidazolidinediones have high microbicidal activities on various fungi and bacteria and are non-toxic to mammals and plants. The imidazolidinediones are prepared by reacting a corresponding 1-unsubstituted 3-(3',5'-dihalogenophenyl) imidazolidine-2,4-dione derivative with a corresponding acylating agent.

10 Claims, No Drawings

N'-ALKANOYL-N''-DIHALOPHENYL IMIDAZOLIDINEDIONES

This invention relates to imidazolidinedione derivatives which are useful as microbicides or insecticidal microbicides.

More particularly, the invention pertains to 3-(3',5'-dihalogenophenyl)-1-acylimidazolidine-2,4-dione derivatives represented by the formula,

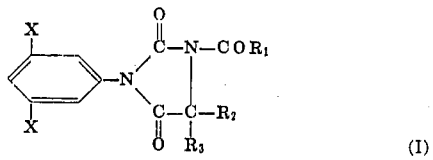
(I)

wherein X is a halogen atom, $R_1$ is a lower alkyl group, and particularly a lower alkyl group having one to three carbon atoms, a lower alkenyl group or a halogenated lower alkyl group having one to three halogen atoms, and $R_2$ and $R_3$ are individually a hydrogen atom or a lower alkyl group and particularly a lower alkyl group having one to three carbon atoms,; to a process for the preparation thereof; and to novel non-therapeutical microbicidal or insecticidalmicrobicidal compositions containing said derivatives as active ingredients.

Some 3-phenyl-1-acylimidazolidine-2,4-dione derivatives have been known as compounds. However, all the present compounds are novel, and it has been found that they have strong and extremely broad microbicidal activities which have never been expected from other known homologous compounds.

That is, there has been attained such a surprising novel knowledge that only in the case where two halogen atoms have simultaneously been substituted at the 3- and 5-positions of the benzene ring of a 3-phenyl-1-acylimidazolidine-2,4-dione derivative, the said derivative displays physiological activities entirely different from those of other homologous compounds, and scarcely has phytotoxicity on plants.

The present compounds have prominent effects on such a wide scope of fungi as *Pyricularia oryzae, Cochliobolus miyabeanus, Pellicularia sasakii, Xanthomonas oryzae, Sclerotinia sclerotiorum, Sclerotinia cinerea, Botrytis cinerea, Alternaria mali, Sclerotinia mali, Sphaerotheca fuliginea, Alternaria kikuchiana, Pellicularia filamentosa* and *Xanthomonas citri*. They can control simultaneously two or more of said fungi and are quite excellent as plant pathogenic microbe-controlling agents. Further, the present compounds can effectively control *Aspergillus niger* which propagates in industrial products and hence are also excellent as industrial microbicides. Moreover, the present compounds are extremely low toxic and have little detrimental actions on mammals and fishes. Since the present compounds have such prominent effects on various injurious fungi which are problems in the industry, it may be said that they are also extremely useful from the industrial standpoint.

An object of the present invention is to provide novel imidazolidinedione derivatives which are useful as microbicides or insecticidal microbicides.

Another object of the invention is to provide a process for producing such useful imidazolidinedione derivatives.

A further object of the invention is to provide microbicidal and insecticidal-microbicidal compositions containing such imidazolidinedione derivatives.

Other objects and advantages of the present invention will become apparent from the following description.

The present compounds represented by the formula (I) can be prepared by reacting a 3-(3',5'-dihalogenophenyl)imidazolidine-2,4-dione derivative of the formula,

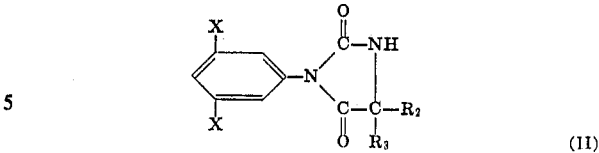
(II)

wherein X, $R_2$ and $R_3$ are as defined previously, with an acid anhydride having the formula, $$(R_1CO)_2O \qquad (III)$$

wherein $R_1$ is as defined previously, or an acid halide having the formula, $$R_1CO - Hal \qquad (IV)$$

wherein $R_1$ is as defined previously, and Hal is a halogen atom.

In the case where the acid anhydride is used, the said 3-(3',5'-dihalogenophenyl)imidazolidine-2,4-dione derivative of the formula (II) is mixed with an equivalent or excessive molar amount of the acid anhydride of the formula (II) in the absence or presence of a suitable solvent, e.g. chloroform, carbon tetrachloride, benzene, toluene, xylene or ligroin, and then the resulting mixture is heated, if necessary, and stirred for a while, whereby a desired compound of the present invention is obtained in a favorable yield.

Further, in the case where the acid halide is used, a mixture of the said 3-(3',5'-dihalogenophenyl)imidazolidine-2,4-dione derivative of the formula (II) and an equivalent or excessive molar amount of the acid halide of the formula (III) is merely heated in the presence or absence of a suitable solvent, e.g. benzene, toluene, xylene, chlorobenzene, chloroform, carbon tetrachloride or nitrobenzene, whereby a desired compound of the present invention may be obtained. If necessary, however, the said mixture is heated and stirred in the presence of a suitable dehydrohalogenating agent, e.g. pyridine, triethylamine, N-methylmorpholine, dimethylaniline or diethylaniline, whereby a desired compound of the present invention can be obtained easily.

The 3-(3',5'-dihalogenophenyl)imidazolidine-2,4-dione derivatives of the formula (II) can be obtained according to a process as described in our West Germany patent application No. P1958183.0. (laid open to public inspection on June 4, 1970).

Examples of the 3-(3',5'-dihalogenophenyl)imidazolidine-2,4-dione derivatives which may be used in the present invention as the starting materials include;

1. 3-(3',5'-difluorophenyl)imidazolidine-2,4-dione,
2. 3-(3',5'-dichlorophenyl)imidazolidine-2,4-dione,
3. 3-(3',5'-dibromophenyl)imidazolidine-2,4-dione,
4. 3-(3',5'-diiodophenyl)imidazolidine-2,4-dione,
5. 3-(3',5'-dichlorophenyl-5-methyl-imidazolidine-2,4-dione, 6. 3-(3',5'-dichlorophenyl)-5,5-dimethyl-imidazolidine-2,4-dione,
7. 3-(3',5'-dichlorophenyl)-5-methyl-5-ethyl-imidazolidine-2,4-dione,
8. 3-(3',5'-dichlorophenyl)-5,5-diethyl-imidazolidine-2,4-dione,
9. 3-(3',5'-dichlorophenyl)-5-n-propyl-imidazolidine-2,4-dione,
10. 3-(3',5'-dichlorophenyl)-5-methyl-5-n-propyl-imidazolidine-2,4-dione,
11. 3-(3',5'-dichlorophenyl)-5ethyl-5-n-propyl-imidazolidine-2,4-dione,
12. 3-(3',5'-dibromophenyl)-5-methyl-imidazolidine-2,4-dione,
13. 3-(3',5'-dibromophenyl)-5-ethyl-5-n-propyl-imidazolidine-2,4dione,
14. 3-(3',5'-dibromophenyl)-5,5-dimethyl-imidazolidine-2,4-dione,
15. 3-(3',5'-diiodophenyl)-5-methyl-imidazolidine-2,4-dione,
16. 3-(3',5'-diiodophenyl)-5-methyl-5-ethyl-imidazolidine-2,4-dione,
17. 3-(3',5'-diiodophenyl)-5-methyl-5-isopropyl-imidazolidine-2,4-dione,
18. 3-(3',5'-difluorophenyl)-5-methyl-imidazolidine-2,4-dione,
19. 3-(3',5'-difluorophenyl)-5,5-dimethyl-imidazolidine-2,4-dione and
20. 3-(3',5'-difluorophenyl)-5,5-diethyl-imidazolidine-2,4-dione.

Examples of the acid anhydrides which may be used in the process of the present invention include acetic anhydride, propionic anhydride, butyric anhydride, acrylic anhydride, crotonic anhydride, monochloroacetic anhydride, dichloroacetic anhydride, trichloroacetic anhydride, monobromoacetic anhydride, monofluoroacetic anhydride, trifluoroacetic anhydride, α-chloropropionic anhydride and α,α-dichloropropionic anhydride.

Examples of the acid halide which may be used in the present invention include acetyl chloride, propionyl chloride, butyryl chloride, acrylyl chloride, crotonyl chloride, monochloroacetyl chloride, dichloroacetyl chloride, trichloroacetyl chloride, monobromoacetyl chloride, monofluoroacetyl chloride, trifluoroacetyl chloride, α-chloropropionyl chloride and α,α-dichloropropionyl chloride, and their bromine, iodine or fluorine analogues.

However, it is needless to say that compounds usable in the present invention are not limited only to those exemplified above.

In actual application as microbicides, the present compounds obtained in the aforesaid manner may be used in a pure form without incorporation of other ingredients such as carriers and the like, or, for easier application as microbicides, they may be used in admixture with such solid carriers as talc, clay and the like or with such liquid carriers as organic solvents and the like, and can be formulated into any of the ordinarily adopted forms such as, for example, dusts, wettable powders, oil sprays, aerosols, tablets, emulsifiable concentrates and granules. Further, they may be used in admixture with other chemicals such as, for example, Blasticidin S, Kasugamycin, Polyoxin, acetylene dicarboximide, 3-[2-(3,5-dimethyl-2-oxocyclohexyl)-2-hydroxyethyl]glutarimide, streptomycin, griseofluvin, pentachloronitrobenzene, pentachlorophenol, hexachlorobenzene, pentachlorobenzyl alcohol, pentachlorobenzaldoxime, 2,6-dichloro-4-nitroaniline, zinc ethylene bisdithiocarbamate, zinc dimethyl thiocarbamate, manganese ethylene bisdithiocarbamate, bis(dimethylthiocarbamoyl) disulfide, 2,4,5,6-tetrachloro-isophthalonitrile, 2,3-dichloro-1,4-naphthoquinone, tetrachloro-p-benzoquinone, p-dimethyl-aminobenzenediazo sodium sulfonate, 2-(1-methylheptyl)-4,6-dinitrophenyl crotonate, 2-heptadecylimidazoline acetate, 2,4-dichloro-6-(o-chloroanilino)-s-triazine, dodecylguanidine acetate, 6-methyl-2,3-quinoxalinedithiol cyclic-S,S-dithiocarbonate, 2,3-quinoxalinedithiol cyclic trithiocarbonate, N-trichloromethylthio-4-cyclohexene-1,2-dicarboximide, N-(1,1,2,2-tetrachloroethylthio)-4-cyclohexene-1,2-dicarboximide, N-(3',5'-dichlorophenyl) maleinimide, N-(3',5'-dichlorophenyl) succinimide, N-(3',5' dichlorophenyl) itaconimide, 3-(3',5'-dichlorophenyl)-5,5-dimethyloxazolidine-2,4-dione, 2,3-dihydro-5-carboxanilide-6-methyl-1,4-oxazine-4,4-dioxide, 2,3-dihydro-5-carboxanilide-6-methyl-1,4-oxazine, 1-(N-n-butylcarbamoyl)-2-methoxycarbonylaminobenzimidazole, O,O-diethyl-S-benzyl phosphorothioate, O-ethyl-S,S-diphenyl phosphorodithioate, O-ethyl-O-phenyl-O-(2,4,5-trichlorophenyl) phosphate, O,O-dimethyl-O-(3-methyl-4-nitrophenyl) phosphorothioate, S-[1,2-bis (ethoxycarbonyl) ethyl]-O,O-dimethyl phosphorodithioate, O,O-dimethyl-S-(N-methyl-carbamoylmethyl) phosphorodithioate, O,O-diethyl-o-(2 - isopropyl-6-methyl-4-pyrimidyl) thiophosphate, 3,4-dimethylphenyl-N-methylcarbamate, iron methylarsonate, 2-chloro-4,6-bis (ethylamino)-S-triazine, 2,4-dichlorophenyxoyacetic acid (including its salts and esters), 2-methyl-4-chlorophenoxyacetic acid (including its salts and esters), 2,4-dichlorophenyl-4'-nitrophenyl ether, sodium pentachlorophenolate, N-(3,4-dichlorophenyl) propionamide, 3-(3',4'-dichlorophenyl)-1,1-dimethylurea, α,α,α-trifluoro-2,6-dinitro-N,N-di-n-propyl-p-toluidine, 2-chloro-2',6'-diethyl-N-(methoxymethyl) acetamide, 1-naphthyl-N-methylcarbamate, methyl-N-(3,4-dichlorophenyl) carbamate, 4-chlorobenzyl-N,N-dimethylthiol carbamate, N,N-diallyl-2-chloroacetamide, ethyl-β-(2,4-dichlorophenoxy) acrylate and cyclohexyl-β-(2,4-dichlorophenoxy acylate, and, in every case, no controlling effects of individual chemicals are decreased. Particularly excellent synergistic effects can be attained when one or more of the 3-(3',5'-dihalogenophenyl)-1-acylimidazolidine-2,4-dione derivatives are mixed with one or more of compounds selected from N-(3',5'-dichlorophenyl)succinimide, O -n-butyl-S-ethyl-S-benzylphosphorodithiolate, Kasugamycin, Polyoxin, O,O-dimethyl-O(3-methyl-4-nitrophenyl) phosphorothioate, 3,4-dimethylphenyl-N-methylcarbamate, zinc ethylene bisdithiocarbamate, N-(1,1,2,2-tetrachloroethylthio)-4-cyclohexene-1,2-dicarboximide, 1-(N-n-butylcarbamoyl)-2-methoxycarbonyl-aminobenzimidazole, 6-methyl-2,3-quinoxalinedithiol cyclic carbonate and pentachloronitrobenzene. Accordingly, simultaneous control of two or more pests and injurious insects is possible, and prominent synergistic effects can be expected depending on combinations of the present compounds with other chemicals. In addition thereto, the present compounds may be used in admixture with such agricultural chemicals as insecticides and mitecides and with fertilizers.

The present invention is illustrated in further detail below with reference to examples, but it is needless to say that the kinds of starting materials for the present compounds, the reaction conditions and the kinds and mixing proportions of additives to be incorporated into the present compounds are not limited only to those set forth in the examples but are variable over wide scopes.

EXAMPLE 1

Preparation process:
A: Process carried out by use of acid anhydride.
Standard operational procedure:

A mixture comprising 0.1 mol of a 3-(3',5'-dihalogenophenyl)-imidazolidine-2,4-dione derivative and 0.3 mol of an acid anhydride is stirred for 3 hours at a reaction temperature of 100° to 150°C. After the completion of the reaction, the acid and the acid anhydride are removed by distillation, and the resulting residue is washed several times with water and then dried, whereby a desired 3-(3',5'-halogenophenyl)-1-acylimidazolidine-2,4-dione derivative is obtained in a favorable yield. If necessary, the crude product is recrystallized from ethanol to obtain a pure product.

Compounds of the present invention were synthesized according to the above-mentioned standard operational procedure to obtain the results as set forth in Table I – 1.

B: Process carried out by use of acid halide.
Standard operational procedure:

A mixture comprising 0.1 mol of a 3-(3',5'-dihalogenophenyl)-imidazolidine-2,4-dione derivative and 0.12 mol of an acid halide is dissolved in 150 ml. of toluene. Into the resulting solution is gradually dropped 0.12 mol of pyridine with stirring at room temperature, and the resulting mixture is heated and refluxed for 8 hours. After cooling, the reaction liquid is thoroughly washed with dilute hydrochloric acid, a 5 percent aqueous caustic soda solution and water. Thereafter, the toluene layer is dried by addition of Glauber's salt, and the toluene is removed by distillation under reduced pressure whereby a desired 3-(3',5'-dihalogenophenyl)-1-acylimidazolidine-2,4-dione derivative is obtained in a favorable yield.

The crude product is recrystallized from ethanol to obtain a pure product.

Compounds of the present invention were synthesized according to the above-mentioned standard operational procedure to obtain the results as set forth in Table I – 2.

TABLE I-1

3-(3',5'-dihalogenophenyl)-1-acylimidazolidine-2,4-dione derivative obtained

| 3-(3',5'-dihalogenophenyl)-imidazolidine-2,4-dione used (Compound No.) | Acid anhydride used | Mark of compound | Chemical structure | Yield percent | Physical constant, M.P., °C. | Elementary analysis (percent) (X: halogen atom) | | | | | | | |
|---|---|---|---|---|---|---|---|---|---|---|---|---|---|
| | | | | | | Calcd. | | | | Found | | | |
| | | | | | | C | H | N | X | C | H | N | X |
| 2 | (CH₃CO)₂O | (A) | 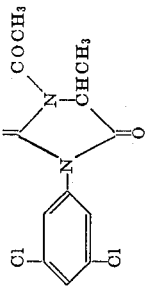 | 85 | 151.0–153.0 | 46.02 | 2.81 | 9.76 | 24.70 | 46.16 | 2.77 | 9.59 | 24.45 |
| 5 | (CH₃CO)₂O | (B) | | 90 | 129.5–131.0 | 47.86 | 3.35 | 9.30 | 23.55 | 48.16 | 3.39 | 9.97 | 23.37 |

TABLE I-1 Continued 3-(3',5'-dihalogenophenyl)-1-acylimidazolidine-2,4-dione derivative obtained

| 3-(3',5'-dihalogenophenyl)-imidazolidine-2,4-dione used (Compound No.) | Acid anhydride used | Mark of compound | Chemical structure | Yield percent | Physical constant, M.P., °C. | Elementary analysis (percent) (X: halogen atom) | | | | | | | |
|---|---|---|---|---|---|---|---|---|---|---|---|---|---|
| | | | | | | Calcd. | | | | Found | | | |
| | | | | | | C | H | N | X | C | H | N | X |
| 6 | (CH₃CO)₂O | (C) | 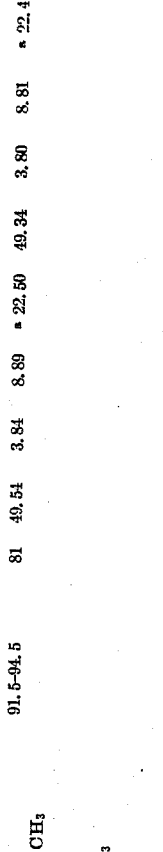 | 81 | 91.5–94.5 | 49.54 | 3.84 | 8.89 | ª 22.50 | 49.34 | 3.80 | 8.81 | ª 22.41 |
| 7 | (C₂H₅CO)₂O | (D) | 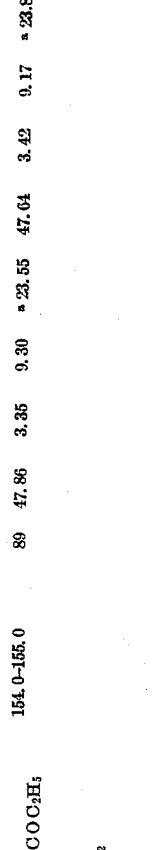 | 89 | 154.0–155.0 | 47.86 | 3.35 | 9.30 | ª 23.55 | 47.04 | 3.42 | 9.17 | ª 23.81 |
| 3 | (CH₃CO)₂O | (E) | 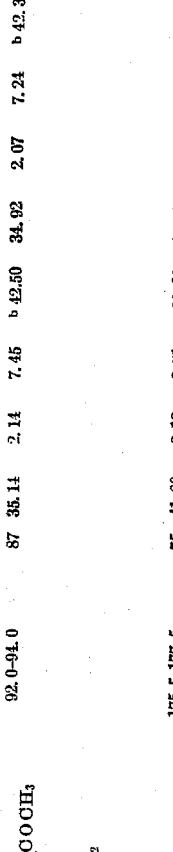 | 87 | 92.0–94.0 | 35.11 | 2.14 | 7.45 | ᵇ 42.50 | 34.92 | 2.07 | 7.24 | ᵇ 42.35 |
| 2 | (ClCH₂CO)₂O | (F) | 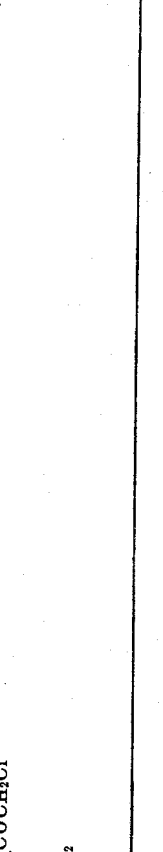 | 75 | 175.5–177.5 | 41.09 | 2.19 | 8.71 | ª 33.08 | 41.40 | 2.20 | 9.03 | ª 32.77 |

ª Cl.  ᵇ Br.

TABLE I-2

| 3-(3',5'-dihalogenophenyl)-imidazolidine-2,4-dione used (Compound No.) | Acid halide used | Mark of compound | Chemical structure | Yield (percent) | Physical constant, M.P., °C. | Elementary analysis (percent) (X: halogen atom) | | | | | | | |
|---|---|---|---|---|---|---|---|---|---|---|---|---|---|
| | | | | | | Calcd. | | | | Found | | | |
| | | | | | | C | H | N | X | C | H | N | X |
| 2 | CH₃COCl | (A) | 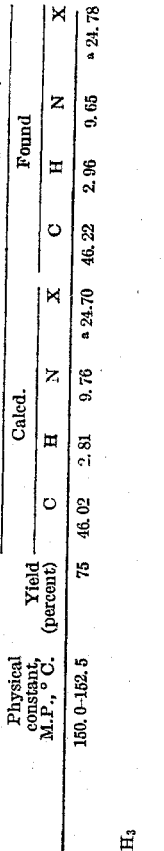 | 75 | 150.0–152.5 | 46.02 | 2.81 | 9.76 | ª 24.70 | 46.22 | 2.96 | 9.65 | ª 24.78 |

TABLE I-2 Continued 3-(3',5'-dihalogenophenyl)-imidazolidine-2,4-dione used (Compound No.)

| Mark of compound | Acid halide used | Chemical structure | Physical constant, M.P., °C. | Yield (percent) | Elementary analysis (percent) (X: halogen atom) | | | | | | | |
|---|---|---|---|---|---|---|---|---|---|---|---|---|
| | | | | | Calcd. | | | | Found | | | |
| | | | | | C | H | N | X | C | H | N | X |
| (F) | ClCH₂COCl | [structure: imidazolidine with 3,5-Cl phenyl and N-COCH₂Cl] | 176.5-178.0 | 81 | 41.09 | 2.19 | 8.71 | ᵃ33.08 | 41.23 | 2.04 | 8.72 | ᵃ29.85 |
| (E) | CH₃COCl | [structure: imidazolidine with 3,5-Br phenyl and N-COCH₃] | 92.0-94.0 | 78 | 35.14 | 2.14 | 7.45 | ᵇ42.50 | 35.37 | 2.29 | 7.31 | ᵇ42.46 |

ᵃ Cl.   ᵇ Br.

EXAMPLE 2

Formulation of compositions:

a. Dust:
Two Parts of the compound (A) and 98 parts of clay were thoroughly pulverized and mixed together to obtain a dust containing 2 percent of active ingredient. In application, the dust was dusted as it was.

b. Dust:
Two Parts of the compound (B) and 98 parts of talc were thoroughly pulverized and mixed together to obtain a dust containing 2 percent of active ingredient. In application, the dust was dusted as it was.

c. Wettable powder:
Fifty Parts of the compound (F), 5 parts of a wetting agent of the alkylbenzenesulfonate type and 45 parts of diatomaceous earth were thoroughly pulverized and mixed together to obtain a wettable powder containing 50 percent of active ingredient. In application, the wettable powder was diluted with water and the resulting solution was sprayed.

d. Emulsifiable concentrate:
Ten Parts of the compound (D), 80 parts of dimethyl sulfoxide and 10 parts of an emulsifier of the polyoxyethylene phenylphenol ether type were mixed together to obtain an emulsifiable concentrate containing 10 percent of active ingredient. In application, the emulsifiable concentrate was diluted with water, and the resulting emulsion was sprayed.

e. Granule:
Five Parts of the compound (E), 93.5 parts of clay and 1.5 parts of a binder of the polyvinyl alcohol type were thoroughly pulverized and mixed together, kneaded with water and then granulated and dried to obtain a granule containing 5% of active ingredient.

f. Composite dust:
Two Parts of the compound (F), 1.5 parts of O-n-butyl-S-ethyl-S-benzyl phosphorodithiolate and 96.5 parts of clay were thoroughly pulverized and mixed together to obtain a dust containing 3.5 percent of active ingredient. In application, the dust was dusted as it was.

g. Composite dust:
1.4 Parts of the compound (A), 0.1 part of Kasugamycin, 2 parts of O,O-dimethyl-O-(3-methyl-4-nitrophenyl) phosphorothioate, 1.5 parts of 3,4-dimethylphenyl-N-methylcarbamate and 95 parts of clay were thoroughly pulverized and mixed together to obtain a dust containing 5 percent of active ingredient. In application, the dust was dusted as it was.

h. Composite dust:
Two Parts of the compound (B), 2 parts of N-(3',5'-dichlorophenyl) succinimide and 96 parts of clay were thoroughly pulverized and mixed together to obtain a dust containing 4 percent of active ingredient. In application, the dust was dusted as it was.

i. Composite wettable powder:
Thirty Parts of the compound (C), 10 parts of pentachloronitrobenzene, 10 parts of (N-1,1,2,2-tetrachloroethylthio)-4-cyclohexene-1,2-dicarboximide, 45 parts of diatomaceous earth and 5 parts of a wetting agent of the alkylbenzenesulfonate type were thoroughly pulverized and mixed together to obtain a composite wettable powder containing 50 percent of active ingredient. In application, the wettable powder was diluted with water and the resulting solution was sprayed.

j. Composite wettable powder:

Thirty Parts of the compound (D), 10 parts of 1-(N-n-butylcarbamoyl)-2-methoxycarbonyl aminobenzimidazole, 10 parts of 6-methyl-2,3-quinoxalinedithiol cyclic-S,S-dithiocarbonate, 5 parts of a wetting agent of the alkylbenzenesulfonate type and 45 parts of diatomaceous earth were thoroughly pulverized and mixed together to obtain a composite wettable powder containing 50 percent of active ingredient. In application, the wettable powder was diluted with water and the resulting solution was sprayed.

k. Composite dust:

Two Parts of the compound (B), 1 part of zinc ethylene bisdithiocarbamate, 0.2 part of Polyoxin PS and 96.8 parts of clay were thoroughly pulverized and mixed together to obtain a composite dust containing 3.2 percent of active ingredient. In application, the dust was dusted as it was.

Typical physiological test results of the present compounds are set forth below with reference to test examples in order to substantiate the facts that the characteristic physiological activities of the present compounds are observed only in the case where a 3,5-dihalogenophenyl group has been substituted in the nitrogen atom of the imide body, and no such activities are observed substantially in the case where other phenyl group has been substituted therein; and that the present compounds have strong and broad microbicidal effects which have never been seen in the conventional microbicides.

TEST EXAMPLE 1

Control effects on *Pyricularia oryzae*

Rice plants (variety: "Waseasahi"), which had been cultivated to 3–4 leaves stage in a rice nursery sectioned into areas of 1 m$^2$, were dusted with 3 kg. per 10 ares of each of test compounds in the form of dusts. After one day, the plants were sprayed and inoculated with a spore suspension of *Pyricularia oryzae*. 10 Days thereafter, the number of spots generated was counted to investigate the microbicidal effects of individual test compounds to obtain the results as shown in Table II. As is clear from Table II, the dusts of the present invention displayed excellent effects, and synergistic effects were obviously observed in the composite dusts.

TABLE II

| Test dust | Active ingredient concentration (%) | Number of spots per leaf |
|---|---|---|
| Zinc ethylene bisdithiocarbamate* | 1.0 | 33.4 |
| Polyoxin* | 0.2 | 42.8 |
| Dust b. | 2.0 (2.0) | 6.8 |
| Composite dust h. | 4.0 (2.0) | 0.9 |
| Composite dust k. | 3.2 (2.0) | 2.3 |
| N-(3,5-Dichlorophenyl) succinimide* | 2.0 | 9.7 |
| Non-treatment | — | 40.5 |

* Control (other ingredient of the composite dust).
Note: The numeral in the parenthesis in the column active ingredient concentration shows the content of the present compound.

TEST EXAMPLE 2

Control effects on *Cochliobolus miyabeanus*

Rice plants (variety: "Waseasahi"), which had been cultivated to the 4 leaves stage in flower pots of 9 cm. in diameter, were dusted by use of a bell jar duster with 100 mg. per pot of each of test chemicals in the form of dusts. After one day, the plants were sprayed and inoculated with a spore suspension of *Cochliobolus miyabeanus*. 3 Days thereafter, the number of spots generated was counted to investigate the microbicidal effects of individual test compounds to obtain the results as shown in Table III. As is clear from Table III, the present compounds displayed markedly excellent effects as compared with the control known compounds. Further, a synergistic effect was observed in the composite dust.

TABLE III

| Test compound | Active ingredient concentration (percent) | Number of spots per leaf |
|---|---|---|
| 3,5-Cl$_2$-C$_6$H$_3$-N(CO-CH$_2$-CO)N-COCH$_3$ | 2.0 | 3.4 |
| 3,5-Cl$_2$-C$_6$H$_3$-N(CO-CHCH$_3$-CO)N-COCH$_3$ | 2.0 | 0.9 |
| 3,5-Cl$_2$-C$_6$H$_3$-N(CO-C(CH$_3$)$_2$-CO)N-COCH$_3$ | 2.0 | 5.7 |
| 3,5-Cl$_2$-C$_6$H$_3$-N(CO-CH$_2$-CO)N-COC$_2$H$_5$ | 2.0 | 1.4 |
| 3,5-Br$_2$-C$_6$H$_3$-N(CO-CH$_2$-CO)N-COCH$_3$ | 2.0 | 2.8 |
| 3,5-Cl$_2$-C$_6$H$_3$-N(CO-CH$_2$-CO)N-COCH$_2$Cl | 2.0 | 3.6 |
| C$_6$H$_5$-N(CO-CH$_2$-CO)N-COCH$_3$* | 2.0 | 38.7 |

TABLE III Continued

| Test compound | Active ingredient concentration (percent) | Number of spots per leaf |
|---|---|---|
| [structure: phenyl-N, N-COCH₃*, C-CH₃, CH₃, with Cl] | 2.0 | 60.4 |
| [structure: Cl-phenyl-N, N-COCCl₃*, CH₂] | 2.0 | 52.6 |
| Composite dust f | 3.5(2.0) | 0 |
| O-n-butyl-S-ethyl-S-benzyl phosphorodithiolate* (Commercially available microbicide) | 1.5 | 20.1 |
| Non-treatment | | 64.3 |

*Control.
NOTE.—The numeral in the parenthesis in the column active ingredient concentration is as mentioned previously.

TEST EXAMPLE 3

Control effects on Pellicularia sasakii

When rice plants (variety: "Waseasahi"), which had been cultivated in porcelain Wagner pots (for 1/5000 are), reached a height of 50 to 60 cm, the plants were dusted by use of a midget duster with 3 kg per 10 ares of each of test chemicals in the form of dusts. After one day, mycelial pieces of Pellicularia sasakii were adhered and inoculated onto the leaf sheaths of individual stems. 5 Days thereafter, the size of each spot generated on the leaf sheaths was measured, and the degree of damage of each stem was calculated to investigate the microbicidal effects of the test chemicals. The results obtained were as shown in Table IV. As is clear from Table IV, the present compounds displayed far more excellent effects than the known compounds.

The degree of damage was calculated according to the following equation:

$$\text{Degree of damage} = \frac{\Sigma \left( \text{Index of infection} \times \text{Number of stems} \right)}{\text{Number of investigated stems} \times 3} \times 100$$

wherein the index of infection is:
0 — No spot was observed on the leaf sheaths.
1 — Spot-like shades were observed on the leaf sheaths.
2 — Spots of less than 3 cm. in size (length) were observed on the leaf sheaths.
3 — Spots of more than 3 cm. in size were observed on the leaf sheaths.

TABLE IV

| Test compound | Active ingredient concentration (percent) | Degree of damage |
|---|---|---|
| [structure: Cl, Cl-phenyl-N, N-COCH₃, CH₂] | 1.4 | 6.5 |
| [structure: Cl, Cl-phenyl-N, N-COC₂H₅, CH₂] | 1.4 | 6.5 |
| [structure: phenyl-N, N-COCH₃*, CH₂] | 1.4 | 100 |
| [structure: Cl-phenyl-N, N-COCH₃*, C-CH₃, CH₃] | 1.4 | 100 |
| [structure: Cl-phenyl-N, N-COCCl₃*, CH₂] | 1.4 | 100 |
| Composite dist, g | 5.0 (1.4) | 0 |
| Kasugamycin* | 0.1 | 100 |
| O,O-Dimethyl-O-(3-methyl-4-nitrophenyl) phosphorothioate* | 2.0 | 73.4 |
| 3,4-dimethylphenyl-N-methylcarbamate* | 1.5 | 100 |
| Non-treatment | | 100 |

*Control.
NOTE.—The numeral in the parenthesis in the column active ingredient concentration is as mentioned previously.

TEST EXAMPLE 4

Control effects on Sphaerotheca fulginea

When pumpkin plants (variety: "Heiankogiku"), which had been cultivated in flower pots of 12 cm. in diameter, reached the 3 to 4 leaves stage, the plants were sprayed with each of given concentration solutions of test chemicals in the form of wettable powders. After one day, the plants were sprayed and inoculated with a spore suspension of Sphaerotheca fulginea. 10 Days thereafter, the infected state of 4 leaves at the upper portion of each plant was observed to calculate the degree of damage according to the following equation:

$$\text{Degree of damage} = \frac{\Sigma \left( \text{Index of infection} \times \text{Number of leaves} \right)}{\text{Number of investigated leaves} \times 5} \times 100$$

wherein the index of infection ranges from 0 (no microbial focus was observed on the lead surfaces) to 5 (microbical focuses were observed all over the leaf surfaces).

In each treatment, seven pots were used to obtain the results as shown in Table V. As is clear from Table V, the present compounds displayed markedly excellent effects as compared with the control compounds. Further, a synergistic effect was obviously observed in the composite wettable powder.

TABLE V

| Test compound | Active ingredient concentration (p.p.m.) | Degree of damage |
|---|---|---|
| [structure: 2,4-dichlorophenyl-N-COCH₃ imide] | 100 | 7.8 |
| [structure: 2,4-dichlorophenyl-N-COC₂H₅ imide] | 100 | 7.4 |
| [structure: 2,4-dichlorophenyl-N-COCH₂Cl imide] | 100 | 8.3 |
| [structure: 4-chlorophenyl-N-COCH₃*, C(CH₃)₂] | 100 | 46.7 |
| Composite wettable powder 1 | 100 (60) | 0.9 |
| 1-(N-n-butyl carbamoyl)-2-methoxycarbonyl-aminobenzimidazole* | 100 | 9.0 |
| 6-methyl-(2,3-quinoxalinedithiol)cyclic carbonate* (commercially available microbicide) | 100 | 7.3 |
| Non-treatment | | 49.4 |

*Control.

NOTE.—The numeral in the parenthesis in the column active ingredient concentration is as mentioned previously.

$$\text{Percentage of stand} = \frac{\text{Number of non-infected seedlings in each treated area}}{\text{Number of germinated seedlings in non-treated and non-inoculated area}} \times 100$$

TEST EXAMPLE 5

Control effects on *Pellicularia filamentosa*

Flower pots of 9 cm. in diameter were individually filled with upland soil. On the surface of said soil was uniformly spread each 10 ml. of infected soil in which had been cultured and propagated *Pellicularia filamentosa*. To this soil was applied 15 ml. per pot of each of 500 p.p.m. aqueous emulsions prepared by diluting with water test compounds in the form of emulsifiable concentrates. After 2 hours, 10 seeds per pot of a cucumber plant (variety: "Kairyo Aodaicho") were sowed in the soil. 5 Days thereafter, the infected state of the germinated seedlings was investigated to obtain the results as shown in Table VI. As is clear from Table VI, the present compounds displayed markedly excellent effects. Further, a synergistic affect was obviously observed in composite wettable powder.

The percentage of stand set forth in the table was calculated according to the following equation:

$$\text{Percentage of stand} = \frac{\text{Number of non-infected seedlings in each treated area}}{\text{Number of germinated seedlings in non-treated and non-inoculated area}} \times 100$$

TABLE VI

| Test compound | Active ingredient concentration (p.p.m.) | Percentage of stand (percent) |
|---|---|---|
| [structure: 2,4-dichlorophenyl-N-COCH₃ imide] | 500 | 96.8 |
| [structure: 2,4-dichlorophenyl-N-COCH₃, CHCH₃] | 500 | 93.5 |
| [structure: 2,4-dichlorophenyl-N-COC₂H₅ imide] | 500 | 93.2 |
| [structure: 2,4-dichlorophenyl-N-COCH₂Cl imide] | 500 | 94.0 |
| [structure: phenyl-N-COCH₃*] | 500 | 0 |
| [structure: 4-chlorophenyl-N-COCH₃*, C(CH₃)₂] | 500 | 0 |
| [structure: 2,4-dichlorophenyl-N-CH₂-CH₂*] | 500 | 48.0 |
| Composite wettable powder 1 | 500 (300) | 100 |
| N-(1 1,2,2-tetrachloroethylthio)-4-cyclohexene-1,2-dicarboximide* | 500 | 37.0 |
| Pentachloronitrobenzene* (commercially available microbicide) | 500 | 92.2 |
| Non-treatment (fungus inoculated) | | 0 |
| Non-treatment (non-inoculated) | | 100 |

*Control.

NOTE.—The numeral in the parenthesis in the column active ingredient concentration is as mentioned previously.

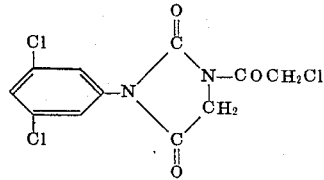

What is claimed is:
1. A 3-(3',5'-dihalogenophenyl)-1-acylimidazolidine-2,4-dione derivative represented by the formula,

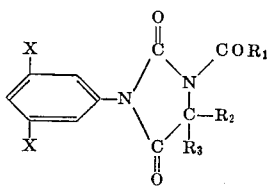

wherein X is a halogen atom; $R_1$ is a lower alkyl group, a lower alkenyl group or a halogenated lower alkyl group having one to three halogen atoms; and $R_2$ and $R_3$ are individually a hydrogen atom or a lower alkyl group.

2. A 3-(3',5'-dihalogenophenyl)-1-acylimidazolidine-2,4-dione derivative according to claim 1, wherein X is a chlorine or bromine atom.

3. A 31(3',5'-dihalogenophenyl)-1-acylimidazolidine-2,4-dione derivative according to claim 1, wherein X is a chlorine or bromine atom, $R_1$ is a lower alkyl group having one to three carbon atoms, and $R_2$ and $R_3$ are individually a hydrogen atom or a lower alkyl group having one to three carbon atoms.

4. A 3-(3',5'-dihalogenophenyl)-1-acylimidazolidine-2,4-dione derivative according to claim 1, wherein $R_1$ is a mono-halogenated lower alkyl group.

5. A compound represented by the formula,

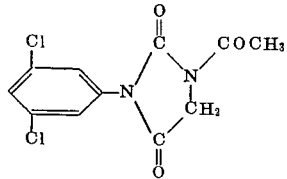

6. A compound represented by the formula,

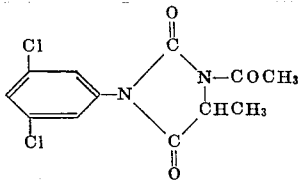

7. A compound represented by the formula,

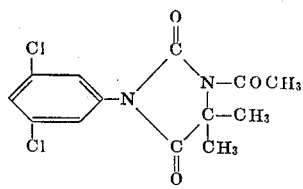

8. A compound represented by the formula,

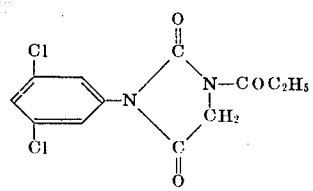

9. A compound represented by the formula,

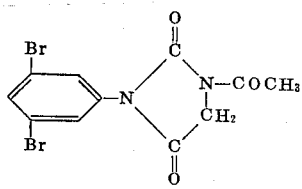

10. A compound represented by the formula,